US009463728B2

(12) United States Patent
Lee et al.

(10) Patent No.: US 9,463,728 B2
(45) Date of Patent: Oct. 11, 2016

(54) SEAT FOR VEHICLE

(71) Applicants: Hyundai Motor Company, Seoul (KR); Industry-University Cooperation Foundation Sogang University, Seoul (KR)

(72) Inventors: In Ju Lee, Seoul (KR); Sung Rae Kim, Seoul (KR); Hyung Joo Kim, Seoul (KR); Do Young Jeon, Seoul (KR); Sang Yoon Han, Seoul (KR); Kook Jin Jang, Seoul (KR)

(73) Assignees: Hyundai Motor Company, Seoul (KR); Industry-University Cooperation Foundation Sogang University, Seoul (KR)

( * ) Notice: Subject to any disclaimer, the term of this patent is extended or adjusted under 35 U.S.C. 154(b) by 31 days.

(21) Appl. No.: 14/553,935

(22) Filed: Nov. 25, 2014

(65) Prior Publication Data

US 2016/0001688 A1  Jan. 7, 2016

(30) Foreign Application Priority Data

Jul. 3, 2014  (KR) ........................ 10-2014-0083329

(51) Int. Cl.
| *A47C 7/02* | (2006.01) |
| *B60N 2/64* | (2006.01) |
| *B60N 2/42* | (2006.01) |
| *H01F 1/44* | (2006.01) |
| *B60N 2/70* | (2006.01) |
| *B60N 2/72* | (2006.01) |

(52) U.S. Cl.
CPC . *B60N 2/64* (2013.01); *B60N 2/42* (2013.01); *B60N 2/70* (2013.01); *B60N 2/7094* (2013.01); *B60N 2/72* (2013.01); *H01F 1/44* (2013.01)

(58) Field of Classification Search
CPC ............ H01F 1/447; B60N 2/64; B60N 2/42
USPC ..................................................... 297/452.41
See application file for complete search history.

(56) References Cited

U.S. PATENT DOCUMENTS

| 7,007,972 | B1* | 3/2006 | Radhakrishnan | ....... B60R 21/26 137/807 |
| 8,468,722 | B2* | 6/2013 | Battlogg | ............... A43B 5/0405 36/117.1 |
| 2005/0258090 | A1* | 11/2005 | Gernon | .................. H01F 1/447 210/222 |
| 2010/0132120 | A1* | 6/2010 | Koerlin | ................ A61G 5/1043 5/654 |
| 2010/0238760 | A1* | 9/2010 | Laun | ....................... H01F 1/447 366/127 |
| 2011/0175744 | A1* | 7/2011 | Englert | ................ A43B 1/0054 340/665 |
| 2013/0147095 | A1* | 6/2013 | Kim | .......................... H01F 1/28 264/496 |
| 2014/0154455 | A1* | 6/2014 | Eppinger | ................ H01F 1/117 428/71 |
| 2015/0298284 | A1* | 10/2015 | David | .................. B24B 37/046 451/59 |

FOREIGN PATENT DOCUMENTS

| KR | 10-2003-0082268 A | 10/2003 |
| KR | 2003-0080519 | 10/2003 |
| KR | 10-2004-0013850 | 2/2004 |
| KR | 10-2009-0006937 | 1/2009 |
| KR | 10-2014-0048521 A | 4/2014 |

\* cited by examiner

Primary Examiner — Laurie K Cranmer
(74) Attorney, Agent, or Firm — Morgan, Lewis & Bockius LLP

(57) ABSTRACT

A seat for a vehicle may include a unit foam that is formed so as to have a magnetic property due to a magneto-rheological fluid, and magnetic bodies that are provided on both sides of the unit foam, respectively, to form a magnetic field passing through the unit foam.

8 Claims, 5 Drawing Sheets

SEAT FOR VEHICLE

CROSS-REFERENCE(S) TO RELATED APPLICATION

The present application claims priority to Korean Patent Application Number 10-2014-0083329 filed Jul. 3, 2014, the entire contents of which is incorporated herein for all purposes by this reference.

BACKGROUND OF THE INVENTION

1. Field of the Invention

The present invention relates to a seat for a vehicle that enables stiffness of a seat foam to be adjusted by the seat foam using magneto-rheological fluids.

2. Description of Related Art

A ride quality of a vehicle is closely associated with not only a shock absorbing device but also an interior seat structure. Accordingly, human engineering researches on a seat through which that a driver and passengers can feel the most convenient and comfortable ride have been actively conducted.

A conventional seat for a vehicle is composed of a seat cushion that supports a driver or passengers and a seat back that is rotatably hinge-coupled to the rear of the seat cushion wherein these seat cushion and seat back are basically comprised of three main components: a seat frame, a cushion material (foam pad), and a skin material (cover).

The seat cushion is a portion facing a human body when a driver and passengers sit, and thus is an important element in determining the comfort of the seat. However, in a case of a conventional seat for a vehicle the stiffness of the seat cushion is determined when manufacturing the seat cushion and thus it is insufficient to assist a driver and passengers when pressure is concentrated momentarily such as a situation of a sudden stop or a posture changing of a user while driving a vehicle happens.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a seat for a vehicle capable of supporting a user's body in response to situations such as a turning, a sudden stop, or the like which occurs while driving a vehicle, and more conveniently and comfortably supporting a user's body even in a momentary change in pressure due to the user's posture changing.

According to various aspects of the present invention, a seat for a vehicle may include a unit foam having a magnetic property due to magneto-rheological fluids, and magnetic bodies provided on both sides of the unit foam, respectively, to form a magnetic field passing through the unit foam.

The unit foam and the magnetic body may form one foam pad apparatus.

A plurality of the foam pad apparatus may be assembled to form a foam pad assembly.

The foam pad apparatus may be formed on only a portion of a seat foam.

A rack and pinion gear allowing at least one of the magnetic bodies to be movable in a longitudinal direction may be coupled to the at least one magnetic body.

The rack and pinion gear may be driven by a motor.

The rack and pinion gear may be driven through a switch in the vehicle.

The rack and pinion gear may simultaneously drive a plurality of the magnetic bodies.

The magnetic body may be a permanent magnet.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 1:
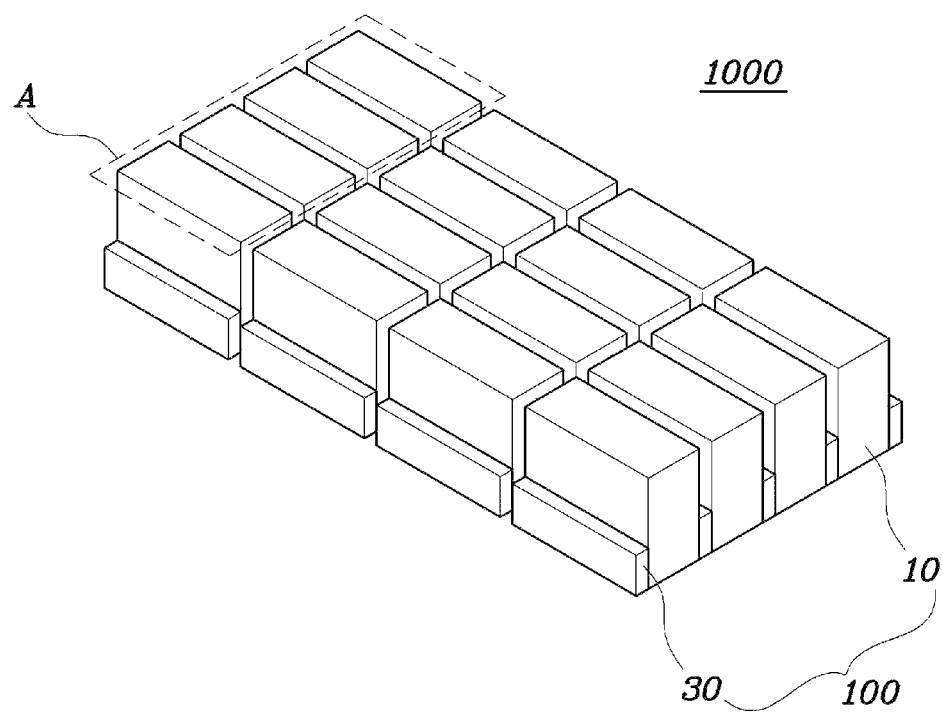
FIG. 1 is a view illustrating an exemplary seat for a vehicle according to the present invention.

FIG. 1 is a view illustrating a seat for a vehicle according to various embodiments of the present invention in which the seat for the vehicle includes a unit foam 10 that is formed so as to have a magnetic property due to a magneto-rheological fluid, and magnetic bodies 30 that are disposed on both sides of the unit foam 10, respectively, to form a magnetic field passing through the unit foam 10. In various embodiments, the unit foam 10 and the magnetic body 30 form a foam pad unit 100, and a plurality of the foam pad units 100 are coupled in a horizontal direction, in a longitudinal direction, or in longitudinal and horizontal directions to form a foam pad assembly 1000.

Even though the foam pad units 100 are formed on only portions contacting the thigh and hip of a user to which the user's pressure is applied greatest in various embodiments, the foam pad unit 100 may be entirely formed on a seat cushion or a seat back of a seat for the vehicle in accordance with the design or environment of the vehicle and such arrangement of the foam pad unit can be varied fully. In addition, a general foam pad can be coupled to the seat cushion or the seat back other than a space occupied by the foam pad assembly 1000 and a cover is coupled to the outer side of a combination of the foam pad assembly 1000 and the foam pad to complete the seat.

The unit foam 10 is formed such that a general foam pad for a seat is formed in a predetermined size so as to have magnetic properties by immersing the foam pad in the magneto-rheological fluid. The magneto-rheological fluid which has a characteristic in which viscosity is changed when a magnetic field is applied is an anti-colloidal solution that disperses particles in a micron size capable of having magnetic properties in non-conductive solvents such as silicon oil, mineral oil, or the like. Therefore, the magneto-rheological fluid is a solidified fluid having a resistance against a transmission force or a fluid such that when the magnetic field is not loaded, a dispersed particle has the nature of a Newtonian fluid, however when the magnetic field is loaded, a dispersed particle is polarized to form a fiber in a parallel direction with the loaded magnetic field.

As described above, the unit foam 10 is formed such that the stiffness thereof is varied due to magnetic properties by immersing the foam pad in the magneto-rheological fluid or wetting the foam pad with the magneto-rheological fluid. Also, the magnetic bodies 30 having one pole are provided on both sides of the unit foam 10, respectively, and the magnetic bodies 30 on both sides are coupled so as to have different poles, respectively. Also, the magnetic body 30 may be a permanent magnet. Accordingly, a magnetic field is formed from an N-pole to an S-pole due to the magnetic body 30 and the viscosity of the magneto-rheological fluid is changed due to the magnetic field.

Figure 2:
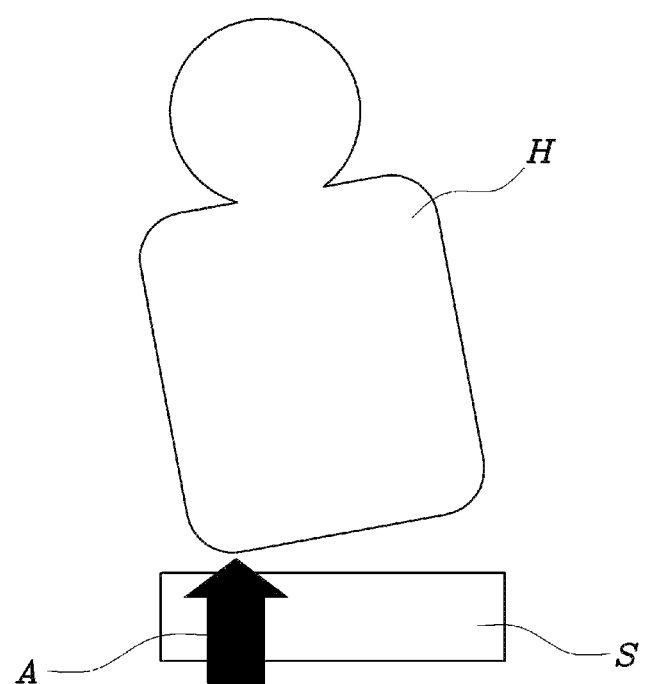
FIG. 2 is a view illustrating a case where pressure is applied to part A of FIG. 1.
Figure 3:
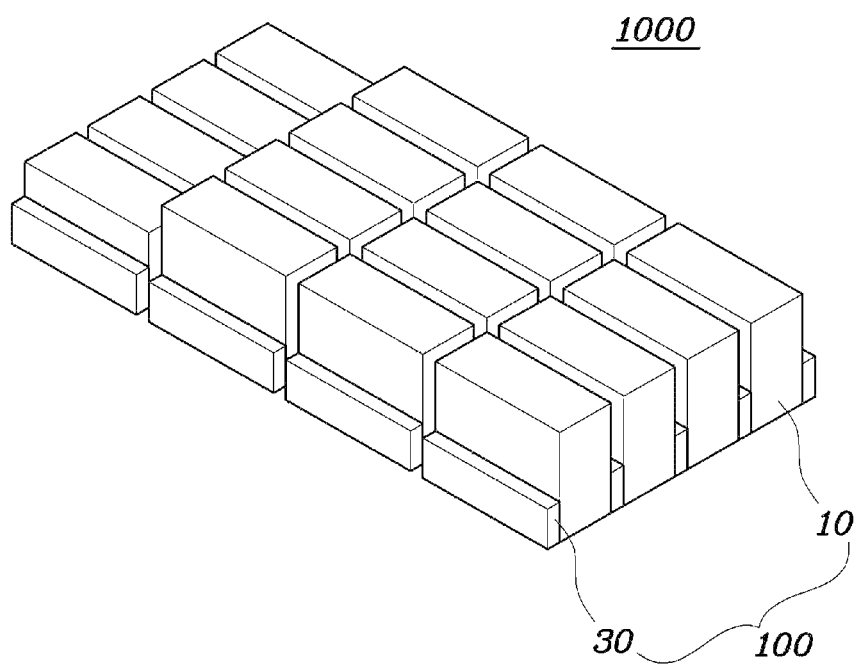
FIG. 3 is a view illustrating part A of FIG. 1 deformed by the pressure applied to part A in FIG. 2.

FIG. 2 is a view illustrating a case where pressure is applied to part A of FIG. 1 and FIG. 3 is a view illustrating part A of FIG. 1 deformed by the situation shown in FIG. 2.

As shown in FIGS. 2 and 3, a user H is leaning to one side according to a running condition of a vehicle and thus different pressures are operating on both sides of the seat cushion S. Various embodiments exemplify that the user H pressurizes more on the left side. Therefore, the unit foam 10 of part A in the foam pad assembly 1000 of FIG. 1 is pressurized, and thus shows the same shape as in FIG. 3.

Figure 4:
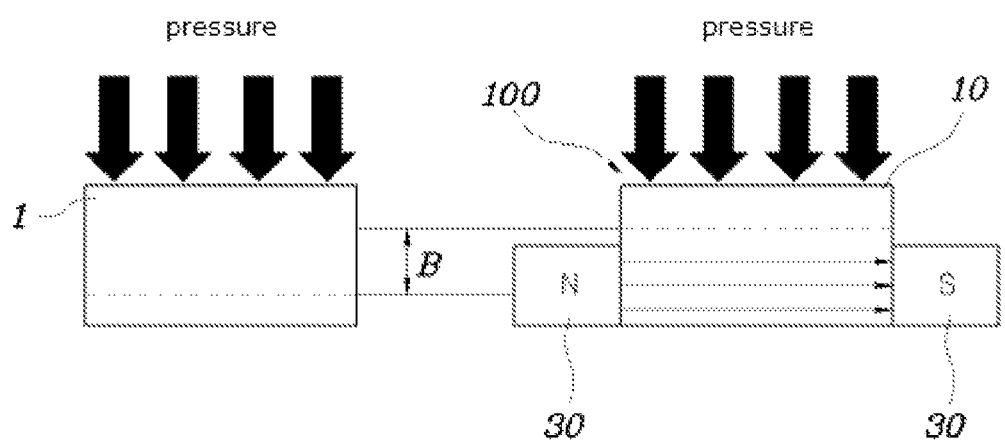
FIG. 4 is a view illustrating a comparison of amounts of deformation between a conventional seat foam and the exemplary seat foam according to the present invention when pressure occurs.

Accordingly, as the size of the unit foam 10 becomes smaller (as the height becomes lower), an area affected by the magnetic field of the magnetic body 30 is increased as compared to the size of the entire unit foam 10 so that the stiffness of the unit foam 10 becomes stronger. Therefore, the seat cushion S of a vehicle effectively supports the weight of the user H. Such an operation is shown in FIG. 4. FIG. 4 is a view illustrating a comparison of the amounts of deformation between a conventional seat foam and a seat foam according to the present invention when pressure occurs, and when the same pressure is applied to the seat cushion of a vehicle, great amounts of deformation entirely occur in a moment, regardless of the user's will in the related art and the seat cushion does not effectively support the user and thus the user feels discomfort. However, in the seat for a vehicle according to the present invention, even if the same pressure is applied to the foam pad, the unit foam 10 affected by the magnetic field of the magnetic body 30 has temporarily stronger stiffness due to the magneto-rheological fluid and the magnetic field, and thus can maintain a condition having small amounts of deformation to effectively support the user. The difference in amount of deformation between the foam pads of the related arts and the present invention is indicated as B.

Figure 5:
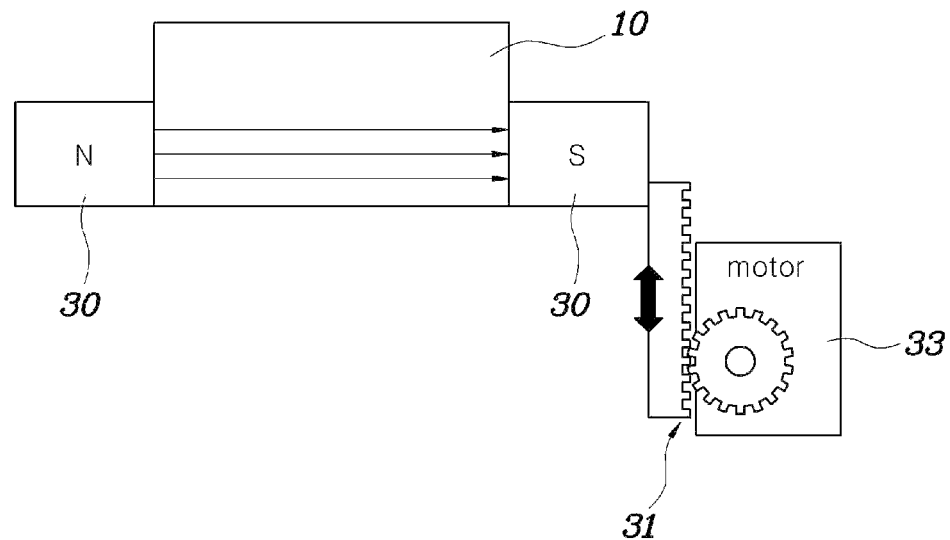
FIG. 5 is a view illustrating when a magnetic body in the exemplary seat foam is at a highest height.
Figure 6:
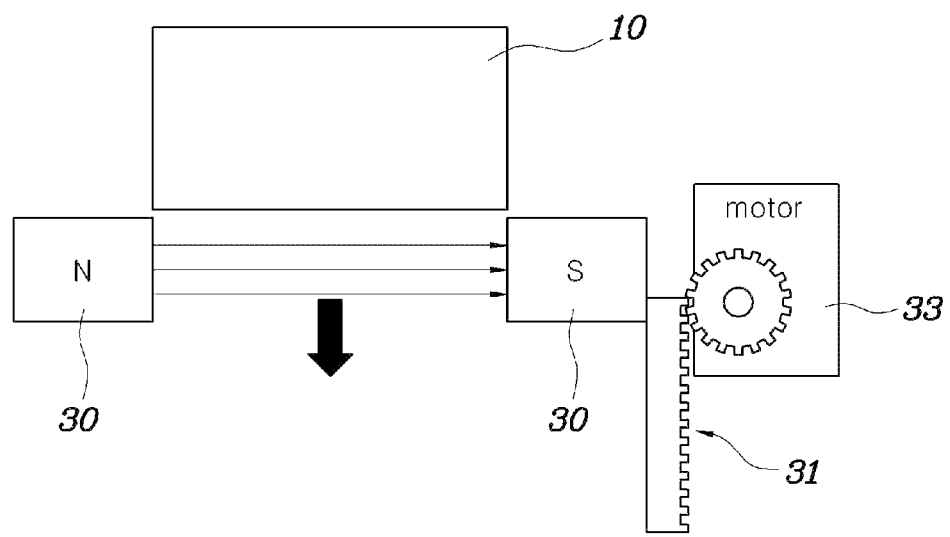
FIG. 6 is a view illustrating when the magnetic body in the exemplary seat foam is at a lowest height.

FIG. 5 is a view illustrating when a magnetic body 30 is at the highest height and FIG. 6 is a view illustrating when the magnetic body 30 is at the lowest height. As shown in FIG. 5 and FIG. 6, a rack and pinion gear 31 enabling the magnetic body 30 to be moved in a vertical direction by driving a motor 33 is coupled to the magnetic body 30. The rack and pinion gear 31 may be drivable through a switch in a vehicle. The rack and pinion gear 31 may be formed to drive simultaneously the plurality of the magnetic bodies 30 in a longitudinal direction or a horizontal direction, or the entire foam pad assembly 1000. Accordingly, the area of the unit foam 10 wetted with the magneto-rheological fluid to be exposed to the magnetic field of the magnetic body 30 is adjusted by driving the magnetic body 30 up and down so that the desired stiffness of the unit foam 10 can be set by more or less being exposed to the magnetic field.

Accordingly, the user performs a proper position change of the magnetic body 30 to adjust the stiffness of an entire foam pad assembly 1000 to be stiff or soft so that it can provide the user with a custom function by adjusting a sports mode, a sedan mode, or the like. Therefore, it becomes possible to adjust the stiffness of the seat cushion to a sports mode or a sedan mode depending on the user's mood even in only one vehicle.

That is, the seat for a vehicle according to the present invention is using a property that the foam pad unit 100 is arranged properly such that when a body is inclined while driving a vehicle, a part of the unit foam 10 on which pressure is concentrated is compressed downward and thus an entire unit foam 10 is exposed to the magnetic field to increase the stiffness thereof. In addition, when a part of the unit foam 10 is not compressed, only one part of the unit foam 10 is exposed to the magnetic field, and thus stiffness of the part not to be compressed becomes weaker than that of the compressed. In addition, depending on the user's preference, the rack and pinion gear 31 is driven by driving a motor 33 to arrange the magnetic body 30 up/downward, thereby selecting a desired stiffness even under no pressure concentration.

According to a seat for a vehicle of the present invention, when pressure concentration occurs while driving a vehicle, the stiffness may be automatically adjusted under the influence of the magneto-rheological fluid and the magnetic field. That is, under the circumstance of pressure concentration such as a sudden stop, the user's posture changes, or the like, a seat for a vehicle effectively supports the weight of the user so as to be able to increase the comfortable and convenient rides. In addition, it is possible to vary the stiffness distribution according to the arrangement of the foam pad unit or the foam pad assembly, to select various kinds of stiffness even in one seat so that provision of a user customized-seat is available, and to affect the advanced vehicle, which are effective in promoting a brand image.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A seat for a vehicle, comprising:
   a unit foam having a magnetic property due to a magneto-rheological fluid and having a plurality of sides; and
   magnetic bodies provided on two sides of the plurality of sides of the unit foam, respectively, to form a magnetic field passing through the unit foam,
   wherein a rack and pinion gear allowing at least one of the magnetic bodies to be movable in a longitudinal direction is coupled to the at least one magnetic body.

2. The seat of the vehicle of claim 1, wherein the unit foam and the magnetic body form a foam pad apparatus.

3. The seat of the vehicle of claim 2, wherein a plurality of the foam pad apparatus are assembled to form a foam pad assembly.

4. The seat of the vehicle of claim 2, wherein the foam pad apparatus is formed on only a portion of a seat foam.

5. The seat of the vehicle of claim 1, wherein the rack and pinion gear is driven by a motor.

6. The seat of a vehicle of claim 1, wherein the rack and pinion gear is drivable through a switch in the vehicle.

7. The seat of a vehicle of claim 1, wherein the rack and pinion gear simultaneously drives a plurality of the magnetic bodies.

8. The seat of a vehicle of claim 1, wherein the magnetic body is a permanent magnet.

\* \* \* \* \*